United States Patent [19]
Troy

[11] Patent Number: 5,327,048
[45] Date of Patent: Jul. 5, 1994

[54] BI-LEVEL LIGHTING CONTROL SYSTEM FOR HID LAMPS

[75] Inventor: Patrick E. Troy, Chicago, Ill.

[73] Assignee: North American Philips Corporation, New York, N.Y.

[21] Appl. No.: 23,534

[22] Filed: Feb. 26, 1993

[51] Int. Cl.⁵ ............................................. H05B 41/42
[52] U.S. Cl. ............................ 315/240; 315/244; 315/291; 315/311; 315/DIG. 4
[58] Field of Search ............... 315/240, 159, 244, 284, 315/291, 311, DIG. 4

[56] References Cited

U.S. PATENT DOCUMENTS

| | | | |
|---|---|---|---|
| 3,989,976 | 11/1976 | Tabor | 315/291 |
| 4,082,981 | 4/1978 | Morton et al. | 315/240 |
| 4,642,525 | 2/1987 | Widmayer | 315/291 |
| 4,675,579 | 6/1987 | Hardy et al. | 315/318 |
| 4,931,701 | 6/1990 | Carl | 315/240 |
| 4,933,607 | 6/1990 | Vogel | 315/293 |
| 4,994,718 | 2/1991 | Gordin | 315/240 |
| 5,004,957 | 4/1991 | Cunningham | 315/291 |
| 5,216,333 | 6/1993 | Nuckolls et al. | 315/291 |
| 5,266,807 | 11/1993 | Neiger | 340/573 |

FOREIGN PATENT DOCUMENTS

0447136 3/1991 European Pat. Off. .
8905536 5/1989 PCT Int'l Appl. .
2213983 8/1989 United Kingdom .

*Primary Examiner*—Richard A. Bertsch
*Assistant Examiner*—David W. Scheuermann
*Attorney, Agent, or Firm*—Brian J. Wieghaus

[57] ABSTRACT

A bi-level control system includes a plurality of slave units, each for connection to a respective ballast and HID lamp of a plurality of HID lighting fixtures, and a common control unit. Each slave unit includes a switched capacitor and a slave relay which has one input connectable to a common line of an AC power supply branch circuit powering the fixtures and another input adapted for receiving a line voltage signal. The control unit includes an output connected to the control inputs of each of the slave units by a single control line and switchably connected to line voltage. Dimming of the HID lamp is accomplished by switching line voltage to the output of the control unit which causes the slave relay to switch the slave capacitor into circuit with the HID lamp and ballast. Use of a single control line connecting each of the slave units to the control unit greatly reduces wiring over known systems. The control unit is also adapted to receive a control input from a sensor via a single input line, further reducing wiring.

34 Claims, 3 Drawing Sheets

BI-LEVEL LIGHTING CONTROL SYSTEM FOR HID LAMPS

BACKGROUND OF THE INVENTION

1) Field of the Invention

The invention relates to a bi-level control system for operating high intensity discharge lamps at a first light output level and a second, reduced light output level, and more particularly, to improvements in such a control system which employs a switched capacitor for regulating the power supplied to the lamps. The invention also relates to an HID lighting system having such a control system and to components of the control system.

2) Description of the Prior Art

High intensity discharge (HID) lamps include, for example, mercury vapor, metal halide, and high pressure sodium discharge lamps. These lamps are operated with a ballast circuit to control the lamp operating current because of the negative voltage-current characteristics of the discharge arc within these lamps. Conventionally, electromagnetic transformer ballasts having a series connected inductance and capacitance (L-C circuit) in the form of a choke and capacitor, have been employed for this purpose.

Typically, the ballast, HID lamp, and reflector are combined into a fixture, or luminaire. For general illumination of, for example, warehouses and factories, a large number of luminaires are suspended form a ceiling. Generally, a plurality of the luminaires are connected in an alternating current (AC) power supply branch circuit and controlled by a single switch or circuit breaker which is effective to switch all of the lamps between an "off" state, in which the lamps are completely extinguished, and an "on" state in which the lamps are operated at full rated power.

Recently, because of energy saving considerations, it has become desirable in other types of lighting systems, for example fluorescent lighting, to employ more sophisticated controls such as occupancy sensors to turn the lamps off when nobody is present in a room and to turn the lights on when someone enters. However, this is not practical for HID lamps, which typically require several minutes to ignite, warm-up and reach their full light output levels. Additionally, most HID lamps have hot re-strike problems which makes it difficult to re-ignite the lamp shortly after being turned off while they still remain at an elevated temperature. With some lamp-ballast combinations it may take up to approximately ten minutes after a lamp has been turned off before it will re-ignite. Thus, employing a control system which turns HID lamps completely off when someone leaves the lighted space is not feasible because the lamps will not provide sufficient light quickly enough if someone re-enters the space shortly thereafter.

However, if HID lamps are operated at a reduced power level, instead of being completely turned off, they will return to a full or near full output level within an acceptable period of time. U.S. Pat. No. 4,994,718 (Gordin) shows such a system and employs a conventional electromagnetic ballast having a series L-C circuit. The light output from the lamp is changed by switching the capacitance in series with the lamp between a first valve which provides a full light output level and a second, reduced valve which lowers the power to the lamp and provides a reduced, energy-saving light output level. For this purpose, a second, switched capacitor is provided in addition to the single capacitor normally employed in the ballast circuit. The two capacitors may be arranged in series or parallel with each other, with one of the capacitors being switched into or out of circuit with the other capacitor to change the capacitance of the L-C circuit.

Gordin's switch for switching the switched capacitor into and out of the ballast circuit is a single electro-mechanical slave relay provided in a ballast housing which contains ballasts and switched capacitors for several lamps. A second electro-mechanical control relay in a separate controller remote from the ballast housing is connected to the slave relay in each ballast housing. A mechanical toggle switch, switchable between a high and low position, controls the position of the control relay, which in turn controls the position of the slave relays to switch the switched capacitors into and out of the ballast circuit to change the light output of their respective lamps.

A disadvantage of the Gordin system, however, is that control of the slave relays is accomplished by a pair of power supply wires connected between the control relay and the slave relay, in addition to the pair of power supply wires used to supply power to the ballasts. Furthermore, one slave relay is used to control the switched capacitor of each of the several ballast circuits contained in a ballast housing. While a common relay might be favorable for the system in Gordin where several ballasts are disposed in a common housing, this is usually not the case. Rather, the more common arrangement is for each lamp and ballast to be in included in a luminaire, or fixture, several of which are spaced from each other in a ceiling. In this type of arrangement, a slave relay common to several luminaires is not practical because of the additional wiring needed to connect the slave relay and switched capacitors to each of the spaced luminaires. For the same reason, the use of an additional pair of power supply wires to connect the control and slave relays, separate from the power supply wires connecting the ballasts, is a disadvantage because of the extra wiring, which is costly in terms of materials as well as labor for installation. Additionally, the switch contacts of the electro-mechanical relay in Gordin are subject to damage from current surges by discharging of the switched capacitor when it is switched out of the L-C ballast circuit.

U.S. Pat. No. 4,931,701 (Carl) shows another bi-level control system which employs a switched capacitor. Instead of an electro-mechanical slave relay as in Gordin, a solid state zero-crossing relay is used. The zero-crossing relay is said to ensure that the switching-in or switching-out of the switched capacitor is timed to occur at a zero-crossing point of the applied voltage. This applies or removes the switched capacitor only when the voltage level is not able to cause excessive voltage spikes or surges by the switched capacitor if it is partly or fully charged when switched, which can cause damage to other components in the circuit.

A disadvantage of such a solid state relay is that it allows a small current flow to the switched capacitor when the relay is not specifically switched for dimming the lamp. The small current flow to the switched capacitor was found to cause unintentional dimming of the lamp from the full light output level. It has also been found that such a relay can false trigger and close at times other than zero-crossing of the input voltage to the lamp. Additionally, solid state relays are relatively expensive as compared to electro-mechanical relays. Furthermore, a pair of control input lines is connected directly to a pair of control inputs of the solid state relay. As in Gordin, the use of an additional pair of control wires connecting the relays is a distinct disadvantage.

As compared to more expensive systems that employ solid state ballast circuitry to provide variable dimming of HID lamps over a range of light levels, operation of HID lamps at only two or several discrete light levels by switching of a switched capacitor as in Gordin and Carl offers a cost effective alternative for achieving energy savings. However, it is desirable to improve upon these known implementations.

SUMMARY OF THE INVENTION

It is an object of the invention to provide a control system having a switched capacitor for operating an HID lamp at a first light output level and at least a second, reduced light output level in which the wiring of the relays is achieved more economically than in the known systems.

It is another object of the invention to provide such a system in which the ballast and relay components are protected from current surges, upon the switching out of the switched capacitor, without employing solid state zero-crossing relays for the switching of the switched capacitor.

It is another object of the invention to provide such a control system with components which can be readily retrofit to existing luminaires which employ conventional electromagnetic ballasts having a series L-C circuit, such as in constant-wattage auto-transformer ballasts or regulated lag ballasts.

According to a first aspect of the invention, a bi-level HID control system, for connection to an HID lighting system having (i) an AC power supply branch circuit having a common, neutral line and a line voltage line and (ii) an HID lamp and a ballast connected to the lamp and to the common and line voltage lines, includes capacitive switching means for switching a capacitance into and out of circuit with the HID lamp and ballast means to switch the lamp between a first and second, different output level and a control means for controlling the capacitance switching means. The capacitance switching means includes a pair of control inputs and the control means includes an output switchably connected to a source of electric potential. With one of the inputs of the capacitance switching means connected to the common line of the AC branch circuit and the other of the control inputs connected to the output of the control means with a single control line, the control means is effective to control the switching of said capacitance switching means with the single control line by switching the source of electric potential to the output of the control means.

Since the capacitance switching means is connected to the same common line as the ballast and only a single control line connects the capacitance switching means to the control means, significantly less wiring is needed than in the prior art systems of Gordin '718 and Carl '701.

In a favorable embodiment, the source of electric potential is line voltage provided at an input of the control means which is connected to the line voltage line of the branch circuit.

In another aspect of the invention, the capacitance switching means includes an electro-mechanical slave relay switchable between a normally closed switch position and an open switch position. The slave relay is connected to the switched slave capacitance such that in the normally closed switch position, the slave capacitance is disconnected from the ballast capacitance and in the open position, the slave capacitance is electrically connected in series with the capacitor of the ballast L-C circuit and the HID lamp. The control means includes a control relay having a switch position connecting the input and output of the control means such that a circuit is completed between the line voltage input of the control means, through the control relay, through the control line and control inputs of the slave relay to the common line for switching the slave relay to switch the lamp between light levels.

Preferably, the switched slave capacitance is a single capacitor component. For a ballast in which the capacitance of the L-C ballast circuit consists of a single capacitor, the single slave capacitor may have a lower rated voltage than the rated voltage of the capacitor component in the ballast because of the series connection when the slave relay is in the closed position. This enables a capacitor component to be selected for the slave unit which is physically of smaller size, than if, for example, the slave capacitor were connected in parallel with the ballast capacitor.

According to another aspect of the invention, a surge suppressor is connected to the slave capacitor and the electro-mechanical slave relay for protecting the switch contacts of the slave relay from current surges by discharging of the slave capacitor upon the switching of the slave capacitor out of the ballast circuit. Thus, an electro-mechanical relay can be used which is less costly than a solid state relay and is protected from voltage surges in a simple, cost effective manner.

In a favorable embodiment, the slave capacitor, slave relay and surge suppressor are provided in a housing to form a slave unit or module. Four lead wires extend from the module: a first lead for connection to the common line of the AC power supply circuit, a second lead for connection to the output of the control unit, a third lead for connection to the one of the pair of ballast circuit output leads connected to the ballast capacitance, and a fourth lead for connection to the lamp in the luminaire. Such a module can readily be retrofit into a luminaire. For each additional luminaire in the HID lighting system, the respective slave unit is connected to the ballast and lamp in the same manner and its second lead is connected to the second lead of the prior slave unit in a serial fashion.

According to yet another aspect of the invention, the control unit includes input receiving means for receiving an input signal on a single input line and switching control means responsive to the input signal for switching the control relay.

These and other objects, features, and advantages of the invention will become more apparent with reference to the accompanying drawing, detailed description, and claims.

DESCRIPTION OF THE PREFERRED EMBODIMENTS

Figure 1:
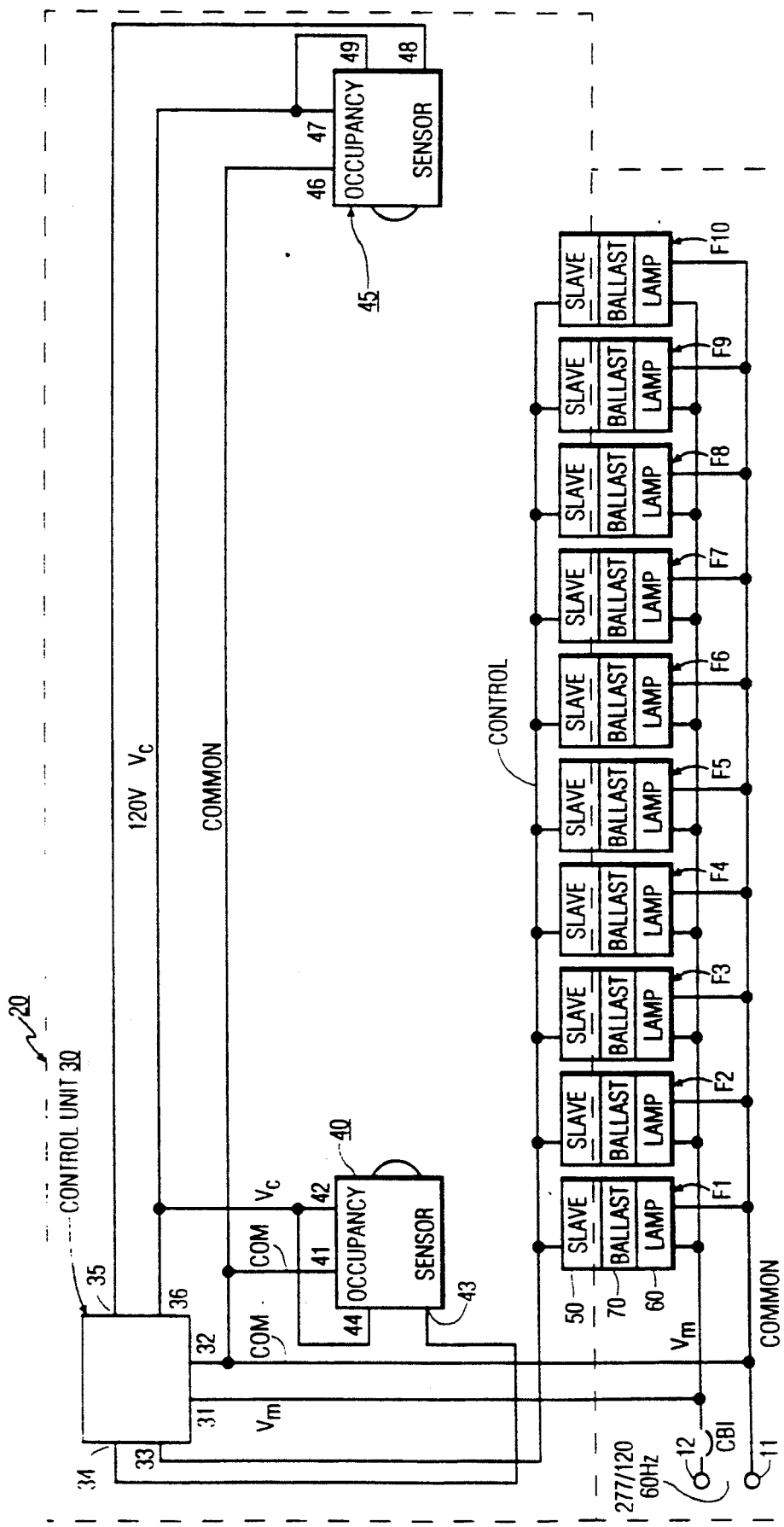
FIG. 1 is a simplified schematic diagram of a lighting system having a plurality of HID lighting fixtures and a bi-level control system in accordance with the invention which includes a common control unit and a respective slave unit in each fixture.

FIG. 1 schematically illustrates a bi-level HID lighting system according to the invention having a branch circuit 10 which includes a plurality of HID lighting fixtures, or luminaires $F_1-F_{10}$. The branch circuit has a pair of input terminals 11, 12 to which a voltage, such as 277V or 120V, may be applied via an AC utility line upon closing of breaker CB1 and includes a common, neutral line and a line voltage line "$V_m$" connected to each of the fixtures for supplying electric power thereto. Each of the fixtures includes an HID lamp 60 and a ballast 70 for controlling the lamp operating current.

A bi-level control system 20 for operating the lighting fixtures at a first light output level and a second, reduced output level includes a respective slave unit 50 in each fixture and a control unit 30 for controlling each of the slave units. The control unit 30 includes a pair of power supply inputs 31, 32 connected to the common and line voltage lines of the branch circuit 10. Each slave unit is connected to the ballast 70 and lamp 60 in its respective fixture, to a control line from single output 33 of the control unit 30, and to the common line of the branch circuit, as will be described in greater detail with reference to FIG. 2. The control system 20 also includes first and second occupancy sensors 40 and 45 which detect the presence or absence of a person within a predetermined area lit by the lighting fixtures. The occupancy sensors each have a pair of power supply terminals 41, 42; 46, 47 connected to power supply terminals 32, 36 of the control unit 30 and a respective single output 43; 48 connected to a respective control input 34; 35 of the control unit.

Figure 2:
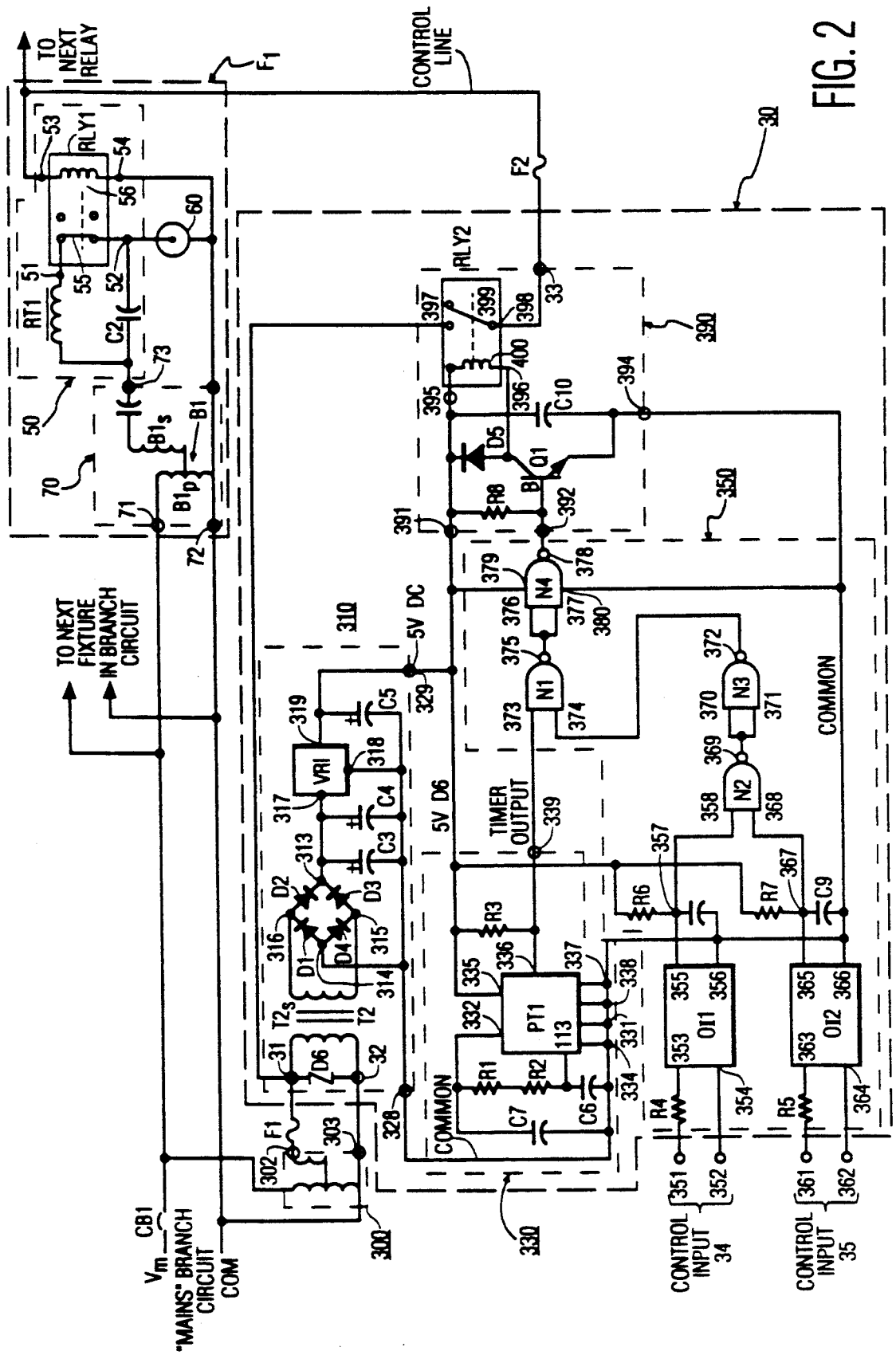
FIG. 2 is a schematic of a control circuit and a slave circuit for the control system illustrated in FIG. 1.

As schematically shown in FIG. 2, the ballast 70 in each of the fixtures $F_1-F_{10}$ of FIG. 1 includes a conventional L-C series circuit having a conventional choke B1, in the form of a center-tapped transformer, and a ballast capacitor C1. The primary coil $B1_p$ is connected at both ends to ballast circuit inputs 71, 72 which are in turn connected to the line voltage "$V_m$" and common lines of the branch circuit. The capacitor C1 is connected between an end of the secondary coil $B1_s$ and an output 73 of the ballast circuit. The other ballast output 74 is connected to the other end of primary $B1_s$. The ballast 70 is conventional and may be, for example, an Advance Transformer Company Model 71A6091 ballast. When connected in a normal fashion to lamp 60 (without the control system according to the invention) the transformer B1 and capacitor C1 operate the lamp at a full rated output light level.

The slave unit 50 (of the control system 20) associated with each fixture includes capacitance switching means comprised of a switched slave capacitor C2 and a relay RLY1. The relay RLY1 is an electro-mechanical relay having switch contacts and a switch member 55 moveable between a first, normally closed switch position and a second, open switch position by coil 56. Capacitor C2 has one end connected to ballast output 73, which is connected to capacitor C1, and its other end connected to switch terminal 52 of relay RLY1 and a lamp terminal of lamp 60. A surge suppressor RT1 is connected at a junction between ballast output 73 and capacitor C2 and to relay switch terminal 51. The surge suppressor is preferably in the form of a choke, but may also be a negative temperature coefficient (NTC) device. The relay RLY1 further includes control inputs 53, 54 for coil 56 connected, respectively, to the control line and to the common line via ballast output 74.

The HID lamp 60 is connected to a junction between the capacitor C2 and switch terminal 52 and to the common line via ballast output 74. The HID lamp 60 may be, for example, a high pressure sodium (HPS) lamp, a metal halide lamp, or a mercury vapor lamp.

In the normally closed switch position of relay RLY1 shown in FIG. 2, the slave capacitor C2 is shunted so that only the ballast capacitor C1 is in series with the lamp 60. When the switch member 55 is moved to the open switch position by coil 56, the capacitor C2 is not shunted and is in series with the lamp 60, the choke B1 and the ballast capacitor C1. With capacitor C2 in series with capacitor C1, lamp 60 will operate at a reduced energy saving light output level as compared to a full light output level when capacitor C2 is shunted.

The control unit 30 which controls each of the slave units includes a regulated power supply circuit 310 and control means comprised of a timing means 330, switching control means 350 and switching means 390.

The regulated power supply 310 provides a regulated 5V DC level on outputs 328, 329. It includes a transformer T2 which steps down a 120 volt input received on the power supply inputs 31, 32 to 9V. Whenever the mains voltage Vm is at a level other than 120 volts, transformer 300 may be used, which provides a voltage of 120V at a pair of output terminals 302, 303. Fuse F1 is connected between output terminal 302 of transformer 300 and input terminal 31 of the regulated power supply and is selected to protect the control unit from damage by excessive current draw. A surge suppressor D6 connected between input terminals 31, 32 is selected to protect against voltage transients. A full wave bridge, connected across the secondary winding $T2_s$ of transformer T2, consists of diodes D1–D4. The cathode of diodes D2, D3 are connected to each other at a junction 313 and the anodes of diodes D1, D4 are connected to each other at junction 314, which is connected to the first output 328 of the regulated power supply 310. The anode of diode D2 and the cathode of diode D1 are connected at a junction 316 which is connected to one side of the secondary winding $T2_s$ and the cathode of diode D4 and the anode of cathode D3 are connected to a junction 315 which is connected to the other side of secondary winding $T2_s$. The full wave bridge rectifies the AC signal received on inputs 31, 32 into a DC signal with ripple.

A commercially available voltage regulator VR1 (such as a model LM7805 available from National Semiconductor), supplies a 5V DC voltage. Input 317 is connected to junction 313 and output 319 is connected to the other output 329 of the regulated power supply circuit 310. One side of each of capacitors C3 and C4 are connected between junction 313 of the full wave bridge and input 317 of voltage regulator VR1. The other side of the capacitors C3, C4 are connected to output 328, ground terminal 318 of voltage regulator VR1, and one end of capacitor C5. The other end of capacitor C5 is connected between output 319 of the voltage regulator VR1 and output 329 and is selected to reduce noise on outputs 328, 329. Capacitors C3 and C4 are selected to smooth out the ripple and produce a constant DC level on outputs 328, 329.

Timing circuit 330 includes a commercially available precision timer PT1, such as a model LM3905 available from National Semiconductor, which is an integrated circuit with eight terminals 331-338 in the form of an eight-pin DIP. Resistor R1 and resistor R2 are connected in series between the voltage reference terminal 332 and the R/C terminal 333 of timer PT1. Capacitor C6 has one end connected to a junction between terminal 333 and resistor R2. Capacitor C7 has one end connected to an end of resistor R1 and terminal 332. Its other end is connected to output 328 of the regulated power supply 310, the other end of capacitor C6 and ground terminal 334, trigger terminal 331, logic terminal 338 and emitter terminal 337 of timer PT1. Resistor R3 has one end connected to the V' terminal 335 and output 329 of the regulated power supply and the other end connected at a junction between the collector terminal 336 and output 339 of timing circuit 330. The capacitor C7 is selected to reduce noise in the timing circuit so the r-c time constant is not influenced by circuit noise. The value of capacitor C6 determines when the collector terminal 336 is switched from a logic zero level to a logic high level.

Switching control circuit 350 includes a first control input 34 for receiving an input signal from a first input, such as occupancy sensor 40 shown in FIG. 1, and a second control input 35 for receiving a second control input, such as from a second occupancy sensor 45. Control input 34 includes two input terminals 351, 352 and control input 35 includes two input terminals 361, 362. Connected to each of the pairs of input terminals is respective optoisolator OI1, OI2. The optoisolators are conventional and may be, for example, a Harris Electronics Model H11AA1 which can receive both AC and DC signals on inputs 34, 35.

Input terminals 352 and 362 are connected directly to the inputs 354, 364 of the respective optoisolators. A respective resistor R4, R5 is connected between each of the terminals 351, 353; 361, 363. The resistors R4 and R5 limit the current from the input devices and set the detection range of the optoisolators, OI1 and OI2. By careful selection of R4 and R5, a wide range of AC or DC voltages (other than 120 volts) can be detected by OI1 and OI2. The output terminals 355, 365 of optoisolators OI1, OI2 are each connected to a respective junction 357, 367 connecting one end of each of capacitor C8 and resistor R6 and capacitor C9 and resistor R7. The other end of capacitors C8, C9 are connected to respective terminals 356, 366 of the optoisolators, to the terminals 331, 334, 337 and 338 of timer PT1 and to an end of capacitors C6, C7. The other end of resistors R6, R7 are connected at a common junction connected to resistor R3 and terminal 335 of the timing circuit 330. The resistors R6 and R7 limit the current for the output of OI1 and OI2 and function as pull-up resistors, driving the output of OI1 and OI2 high whenever an input signal does not exist. The capacitors C8 and C9 filter the ripple and stabilize the output of OI1 and OI2.

The control circuit 350 further includes logic (NAND) gates N1-N4 which are embodied by a 14 pin integrated circuit. The two inputs 358, 368 for NAND gate N2 are connected, respectively, to junction 357 between resistor R6 and capacitor C8 and to junction 367 between capacitor R7 and capacitor C9. Both inputs 370, 371 of gate N3 are connected to the output 369 of gate N2. Gate N1 has one input 373 connected to output 339 of the timing circuit 330 and its other input 374 connected to output 372 of gate N3. Gate N4 has both inputs 376, 377 connected to output 375 of gate N1. Terminals 379, 380 of gate N4 represent the power supply terminals for the integrated circuit and are connected to the common and 5V DC lines from the outputs 328, 329 of power supply circuit 310. The NAND gates N3 and N4 act as inverting buffers for the output signals from the NAND gates N1 and N2 and insure that the signals from optoisolators OI1 and OI2 are decoded properly.

Switching circuit 390 includes a single control output 33 of control unit 30, connected via fuse F2 and a single control line to control terminal 53 of slave relay RLY1. Inputs 391 and 394 are power supply inputs connected to the 5V DC and common lines. Input 392 is connected to output 378 of gate N4 and control circuit 350. Resistor R8 has one end connected at a junction to base B of transistor Q1 and input 392. The other end of resistor R8 is connected to input terminal 391, the cathode of diode D5, one side of capacitor C10, and input terminal 395 of control relay RLY2. The anode of diode D5 is connected to the other input terminal 398 of relay RLY2 and to the collector of transistor Q1. The emitter of transistor Q1 is connected to the other end of capacitor C10 and power supply terminal 394. Relay RLY2 is an electro-mechanical relay having switch contacts and a switch member 399 moveable between a first, normally open switch position shown in FIG. 2 and a second, closed switch position, by coil 400. Relay switch terminal 397 is connected to the line voltage input terminal 31 of voltage regulating circuit 310 and switch terminal 398 is connected to output 33 of the switching circuit and control unit.

The operation of the control system is as follows. When "mains" circuit breaker CB1 of the branch circuit 10 is closed, voltage Vm is supplied to the ballasts 70 of fixtures $F_1$-$F_{10}$ via ballast inputs 71, 72 and to the control unit 30 at power supply inputs 31, 32. Switch member 55 of the slave relay RLY1 is in its normally closed position (providing a conductive path between terminals 51, 52) with coil 56 in an un-energized state. When breaker CB1 closes, current flows through the surge suppressor RT1, across the closed switch contacts of relay RLY1, and ignites the lamp. It should be understood that either ballast 70 or the lamp includes a conventional ignitor (not shown) which provides a sufficient starting pulse to start the lamp. The switched, slave capacitor C2 is shunted and is not in the lamp-ballast circuit. Transformer B1 and capacitor C1 of ballast 70 regulate lamp current to the required level for full light output.

The application of voltage to the timing circuit 330 upon closing of breaker CB1 via the regulated voltage supply circuit 310 begins the timing sequence. As the timing sequence begins, the output 336 of the precision timer PT1, and thus output 339 of timing circuit 330 is at a logic zero level. The output 339 remains at this zero level until the capacitor C6 charges to a sufficient level to cause the output 336 of PT1 to switch to a high logic state. The capacitance of capacitor C6 is selected such that the output of timer PT1 does not switch to the high logic state until the HID lamp 60 has reached a steady, full light output level. This prevents the HID lamp from being switched to a reduced light-output level until the lamp is fully warmed up. As long as the output 336 of PT1, (and thus input 373 of logic gate N1) is at logic zero, the logic gate N1 is disabled which prohibits the output 375 of logic gate N1 from changing states no matter what state the other input 374 might be. With logic gate N1 disabled, its output 375 and inputs 376, 377 of gate N4 are at a logic high level, making output 378 a logic low.

The resistor R8 is used as a pull-up resistor for the output of N4. Whenever the output 378 of logic gate N4 is at logic low, the transistor Q1 is off, preventing the coil 400 of relay RLY2 from energizing and keeping switch member 399 in its normally open position. In this normally open position of RLY2, no control signal is applied to coil 56 of RLY1 over the control line and the lamp 60 remains at full light output level.

When the precision timer PT1 reaches the desired time delay from the initial closing of circuit breaker CB1, the output 336 of PT1 is switched off which causes the resistor R3 to pull the output 336 to a logic high level. This enables the logic gate N1 to be controlled by the output 372 of the logic gate N3.

When an input signal (such as from an occupancy sensor 40 or 45 in FIG. 1, or a wall switch, photocell, infrared sensor, etc.) is applied to either control input 34 (terminal 351, 352), control input 35 (terminals 361, 362), or both, a low logic level signal appears on the outputs (junctions 357, 367) of optoisolator OI1 and/or OI2. A low logic level on either junction 357, 367 or both, seen at inputs 358, 368 of gate N2, makes output 369 of NAND gate N2 a logic low. This makes inputs 370, 371 of gate N3 low and output 372 of gate N3 high. With input 373 also high because of PT1 having reached its designated delay time, and input 374 high, the output 375 and inputs 376, 377 of gate N4 will be low. This makes output 378 high.

When the logic high signal is applied form output 378 of gate N4 to the base of the transistor Q1, the coil 400 of relay RLY2 is energized which closes the contacts across terminals 397, 398. This provides a control signal on the control line and energizes coil 56 of slave relay RLY1 by completing a circuit from input 31 of regulated power supply 310 (which is at line voltage Vm) across switch contacts 397, 398 of RLY2 over the control line to terminal 53 of RLY1, through coil 56 to terminal 54, which is connected to the common line of branch circuit 10. With coil 56 of relay RLY1 energized, switch member 55 is moved to its open position and allows the capacitor C2 to enter the lamp-ballast circuit in series with capacitor C1, ballast B1 and lamp 60. The capacitor C2 is selected to bring the lamp 60 to the desired low, stable and energy saving level.

When the input signal is removed from the control input 34 or 35 to which it was applied, and there is no input signal on either of the control inputs 34, 35, the output 378 of logic gate N4 again becomes logic low and the transistor Q1 is switched off. With coil 400 now un-energized, the switch member 399 moves to its normally open position and the circuit from power supply input 31, through relay RLY2, input 53 and coil 56 of relay RLY1 in the slave units is opened, and switch member 55 moves back into its normally closed position.

Movement of switch member 55 into its normally closed position places the surge suppressor RT1 back into the circuit where it can clamp the high inrush current from the discharging capacitor C2, protecting the switch contacts of relay RLY1 and adjacent components from damage from high current spikes. In the switching circuit 390, the diode D5 serves as a discharge path for coil 400 of the relay RLY2 and prevents voltage transients from feeding back onto the DC supply line connected at inputs 391, 394. The capacitor C10 functions as a bypass capacitor by filtering noise form the DC supply line. The fuse F2 protects the output 33 of control unit 30 from over current conditions caused by a short circuit on the control line.

Figure 3:
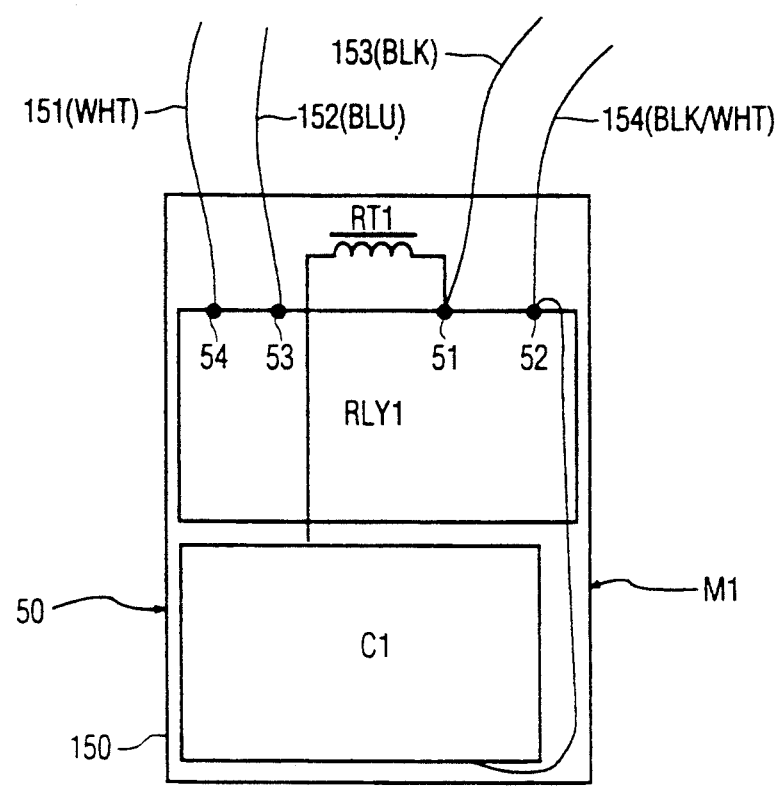
FIG. 3 illustrates a slave unit for connection in an HID fixture.

The capacitor C2, surge suppressor RT1, and the relay RLY1 of slave unit 50 are preferably potted in a plastic capacitor housing 150 (such as a Model $2 can, make Advance Transformer Company) and are installed in a fixture as a complete module M1 (FIG. 3). This module has only four wires, which makes the module easy and fast to retrofit into a fixture containing a lamp 60 and ballast 70. A first wire 151 (white) is used to connect the terminal 54 of the slave relay to the common, neutral line of the branch circuit. A second wire 152 (blue) connects the terminal 53 of the slave relay to the single control line, which is connected to output 33 of the control unit. A third wire 153 (black) is used to connect the slave capacitor C2 to the ballast lead wire connected to the ballast capacitor C1 and the fourth wire 154 (black/white) connects the other side of slave capacitor C2 and to a terminal of the discharge lamp. The above components can also be potted in an aluminum capacitor can or various ballast housings depending on the size constraints of the lighting fixture.

The slave unit in the form of module M1 can easily be retrofit into a fixture by removing the ballast lead which is connected internally to the ballast capacitor C1 from one of the lamp terminals. This ballast lead is then connected to the black lead from module Mi. The black/white lead is then attached to the one lamp terminal. The white lead is then attached to the common line along with the white lead of the ballast, and the blue lead is attached to the control line coming from output 33 of the control unit.

The series configuration of the fixture capacitor C1 and the slave capacitor C2 with the ballast capacitor C1 reduces the physical size of capacitor C2 because a lower voltage rated part may be used than if they were arranged in parallel. A small size for the ballast module M1 is important because of the limited space available in a fixture. If C1 and C2 are used in a parallel configuration, C2 must be rated at the same voltage level as C1 which forces C2 to be physically larger than in the series connection. For example, for a 400 watt metal halide lamp, C1 and C2 would both be 400 volt parts in a parallel circuit configuration whereas C1 is a 400 volt part and C2 is a 120 volt part in the series circuit shown in FIG. 2.

The series connection of C1 and C2 also allows the contacts of relay RLY1 to be rated at a lower voltage than it would be if it were used in the parallel configuration. (120 volt contact rating for a series circuit and 400 volts for the parallel circuit). This also reduces the physical size of the relay, permitting a smaller module M1 than if a parallel configuration were used. In the module shown in FIG. 3 the housing 151 had dimensions of 124.2 mm ×47.2 mm. The dimensions of capacitor C2 was 57 mm ×38.6 mm for a 40 µf, 120 v. The relay RLY1 was a Potter and Brumfield kup series with dimensions of 55.2 mm ×46.7 min.

The series configuration of capacitors C1 and C2 also lessen the effect of inrush currents when C2 is switched out of the circuit. The hazards of high surge currents are more pronounced in a parallel configuration.

In the control system shown in FIG. 1, the control unit 30 is powered directly from the branch circuit 10 it controls. This insures that the controller timing circuit 330 is initiated every time power is applied or restored to the lighting fixtures. Also, this enables the use of only one control wire from the output 33 of the control unit to slave relay RLY1 in the lamp fixtures as the common line is shared by the slave unit and the ballast. This simplifies the installation or addition of the module M1 into an existing fixture and reduces wiring as compared to the known systems.

As previously mentioned, the optoisolators 011 and 012 are capable of sensing AC or DC current. By careful selection of resistors R4 and R5, a wide range of AC or DC voltages may be used as inputs to the controller. This enables the controller to interface with virtually all types of sensing or switching devices such as: occupancy detectors, infrared sensors, photocells, proximity switches, wall switches, etc., which may supply its control signal at levels other than 120 volts. It can also be interfaced to a personal computer or a computerized time clock.

The external occupancy sensors 40, 45 are directly powered from the control unit 30. This insures that the sensors are operational whenever the controller receives power. This further simplifies wiring as neutrals can be shared; therefore, only one control wire is needed to be brought to the inputs 34, 35 of the control unit from the outputs 43, 48 of the sensors 40, 45. The other sensor outputs 44, 49 are connected back to their respective common lines connected at inputs 42, 47. The single control wire would be connected to terminals 351, 361 of control inputs 34, 35 of the control unit. The other terminals 357, 362 are then tied back to the common line within the control unit 30, for example, at input 32.

Since the control inputs to the controller are "floating" and isolated, the sensors may also be connected to a different branch circuit than the contoller or can be out of phase with respect to the phasing of the controller.

The timing circuit of the controller can be made adjustable by changing the capacitance of capacitor C6 so the timing interval is compatible with the type of lamps being controlled (i.e. metal halide, mercury vapor or sodium).

The following Parts Table lists components used int eh circuit of FIG. 2 for 400 watt metal halide lighting fixtures.

PARTS TABLE

| PARTS | PART DESCRIPTION |
|---|---|
| R1,2 | 3.6M, 5%, 1/4W |
| R3,6,7 | 10K, 5%, 1/4W |
| R4,5 | 20K, 5%, 5W |
| R8 | 470 OHM, 5%, 1/4W |
| C1 | SELECTED WITH BALLAST BL TO OPERATE LAMP AT FULL POWER (i.e.: 400W MH LAMP-24 uF, 400V) |
| C2 | SELECTED TO DIM LAMP TO DESIRED LEVEL (i.e.: 40 uF 120V) |
| C3,4 | 100 uF, 20%, 16V |
| C5 | 1 uF, 20%, 25V |
| C6 | 100 uF, 20%, 10V |
| C7,10 | .1 uF, 20%, 550V |
| C8,9 | 22 uF, 20%, 6.3V |
| D1-D5 | 1A, 50V |
| D6 | SURGE ABSORBER, 220V |
| VR1 | 5V REGULATOR (National Semiconductor, Model LM7805) |
| PT1 | PRECISION TIMER (National Semiconductor, Model LM2905) |
| OI1,2 | OPTOISOLATOR (Harris Electronics, Model H11AA1) |
| N1-N4 | QUAD 2-INPUT NAND GATE (National Semiconductor, Model 7400N) |
| Q1 | NPN 30V 1.5W TRANSISTOR (2N222) |
| RLY1 | SPDT 120VAC 30A |
| RLY2 | SPDT 5VDC 10A |
| T1 | OPTIONAL 277V:120V |
| T2 | 120V:9V |
| RT1 | CHOKE COIL OR INRUSH CURRENT LIMITER (Negative Temperature Coefficient) |

While there have been shown to be what is presently considered to be the preferred embodiment of the invention, it will be apparent to those of ordinary skill in the art that various modifications can be made without departing form the scope of the invention as defined by the appended claims.

For example, while the circuit of FIG. 2 and the components listed in the Parts Table above are for 400 watt metal halide lighting fixtures the bi-level lighting control with shared neutrals can be modified to control various wattages of metal halide lamps as well as other gaseous discharge lighting sources such as mercury, high pressure sodium, and fluorescent which utilize constant wattage autotransformer (CWA) and (CWI) ballast circuits. The design shown above is for the control of ten lighting fixtures (based on a 277 volt branch circuit). Other lamp types and other wattages will dictate the total number of lamp fixtures that can be controlled on the branch circuit. The final determinating factor will be the total wattage or loading on the branch circuit breaker.

I claim:

1. A bi-level control system for an HID lighting system having (i) an AC power supply branch circuit with a line voltage line and a common line and (ii) a luminaire including an HID lamp and a ballast means connected to the HID lamp and to the line voltage and common lines for providing stable operating power to the lamp, said control system comprising:

capacitance switching means for switching a capacitance into and out of circuit with said HID lamp and ballast means to switch said HID lamp between a first light output level and a second, different light output level, said capacitance switching means having a pair of control inputs; and control means including an output switchably connectable to a source of electric potential such that, with one of said control inputs of said capacitance switching means connected to the common line of the AC branch circuit and the other said control input of the capacitance switching means connected to said output of said control means with a single control line, said control means is effective to control the switching of said capacitance switching means with the single control line by switching of the source of electric potential to said output of said control means.

2. A bi-level control system according to claim 1, wherein said control means includes an input connectable to the line voltage line of the AC branch circuit, the electric potential switchable to said output of said control means being line voltage.

3. A bi-level control system according to claim 2, wherein said capacitance switching means includes a switched slave capacitor and a slave relay which includes said control inputs, and said control means includes a control relay having a first switch position connecting said input and output of said control means such that a circuit is completed between said input of said control means, through said control relay, through said control line and control inputs of said slave relay to said common line for switching said slave relay to switch said lamp between said first and second light output levels.

4. A bi-level control system according to claim 3, wherein said slave relay is an electro-mechanical relay having a moveable switch member moveable between first and second switch positions and an energizeable coil connected between said control inputs for moving said switch member.

5. A bi-level control system according to claim 4, wherein said capacitance switching means further comprises surge suppression means for suppressing current surges across said slave relay.

6. A bi-level control system according to claim 1, wherein said control means includes means for receiving a control input on a single input line.

7. A bi-level control system according to claim 6, wherein said means for receiving a control input comprises an optoisolator having a pair of inputs, one of said inputs being connected to a common line within said control unit connectable to the common line of the AC branch circuit and the other optoisolator input being connectable to the single input line.

8. A bi-level HID control system for connection to an HID lighting system having (i) an AC power supply branch circuit having a common line and a line voltage line and (ii) at least one HID luminaire, the luminaire including an HID lamp and ballast circuit connected thereto for controlling the operating current through the lamp, the ballast circuit having an inductance and a ballast capacitance connected in series with the lamp, a pair of power input leads each connected to a respective one of the common and line voltage lines of the branch circuit, and a pair of output leads, including one lead connected to the ballast capacitance, for connection to the lamp, said bi-level control system comprising:
    a) a control unit comprising
        i) an input for connection to the line voltage line,
        ii) an output, and
        iii) control means for switchably connecting said output to said input, and
    b) a slave unit for connection in the HID luminaire, said slave unit comprising
        i) a slave capacitance, and
        ii) an electro-mechanical slave relay for switching said slave capacitance into and out of the ballast circuit in the luminaire, said slave relay including a moveable switch member moveable between first and second switch positions and a coil energizeable for moving said switch member,
        iii) a first lead connected to one side of said coil for connection to the common line of the branch circuit,
        iv) a second lead connected to the other side of said coil for connection to said output of said control unit, said second lead being connectable to said output with a single control line,
        v) a third lead connected to one side of said slave capacitance for connection to the one of the pair of ballast circuit output leads connected to the ballast capacitance,
        vi) a fourth lead connected to the other side of said slave capacitance for connection to the lamp in the luminaire,
with said leads of said slave unit respectively connected to said output of said control unit, the common and line voltage lines of the branch circuit, and ballast, said coil of said slave relay is responsive to a line voltage signal received on said second lead from said output of said control unit to move said switch member for one of (a) switching said slave capacitance into the ballast circuit and (b) switching said slave capacitance out of the ballast circuit, whereby the light output level of the HID lamp is switched from a first light output level to a second, different light output level.

9. A bi-level lighting control system according to claim 8, wherein said control unit includes a pair of power inputs each connectable to a respective one of the neutral and line voltage lines of the branch circuit, and said control means comprises
    i) a switching means comprised of a master electro-mechanical control relay having a normally open switch position and a closed switch position, in said closed position said control relay connecting said line voltage input to said output of said control unit and
    ii) switching control means for switching said control relay between said normally open switch position and said closed switch position, in said closed position the line voltage signal in said output of said control unit switching said slave relay from said normally closed to said open position.

10. A bi-level lighting control system according to claim 8, wherein said control system comprises a plurality of said slave units, said second lead of one of said slave units being connectable to said output of said slave unit, and said second lead of each successive additional control unit being connectable to said second lead of each prior slave unit, and with said slave units so connected each of said capacitance switching means of said slave units is responsive to the line voltage signal on the output of said control unit.

11. A bi-level lighting control system according to claim 8, wherein said first switch position of said slave relay is normally closed and said second switch position is normally open, and said slave relay is connected to said slave capacitance and said leads of said slave unit such that with said slave relay in said normally closed switch position said slave capacitance is disconnected from the ballast capacitance and in the open position of said slave relay said slave capacitance is electrically connected with said ballast capacitance and HID lamp, whereby in said open switch position of said slave relay the HID lamp operates at a reduced light output level reduced with respect to the light output level in the closed switch position of said slave relay when said slave capacitance is not switched in said ballast circuit.

12. A bi-level lighting control system according to claim 11, wherein said slave capacitance is a single capacitor component, and wherein for connection of said slave unit to a ballast circuit in which the ballast capacitance consists of a single capacitor component having a rated voltage, said capacitor component in said slave unit has a lower rated voltage than the rated voltage of the capacitor component in the ballast circuit.

13. A bi-level lighting control system according to claim 12, wherein said slave unit further includes a surge suppressor connected to said slave capacitor and said electro-mechanical slave relay for protecting said slave relay from current surges from discharging of said slave capacitor upon the switching of said slave capacitor out of the ballast circuit by said slave relay.

14. A bi-level lighting control system according to claim 13, wherein said slave unit includes a housing in which said slave capacitor, slave relay, and surge suppressor are enclosed, said slave leads extending from said housing for connection to the common line of the branch circuit, the control line from said output of said control unit, the one of the ballast leads connected to the ballast capacitance, and a lamp terminal of the HID lamp.

15. A bi-level lighting control system according to claim 11, wherein:
   said control means comprises
   i) switching means comprised of an electro-mechanical control relay having a normally open switch position and a closed switch position, and
   ii) switching control means for switching said control relay between said normally open switch position and said closed switch position, in said closed position said output of said control unit being connected to said input of said control unit such that line voltage appears on said output and said slave relay is switched from said normally closed to said open switch position.

16. A bi-level lighting control system according to claim 15, wherein said switching control means further comprises input receiving means for receiving AC or DC input signals,
   said switching control means being responsive to an input signal received by said input receiving means for controlling switching of said master relay.

17. A bi-level control system according to claim 16, wherein said input receiving means comprises an optoisolator having a pair of inputs, one of said inputs being connected to a common line within said control unit and the other being connectable to a single input line.

18. A bi-level lighting control system according to claim 16, wherein said control means further includes timing means coupled to said switching control means for preventing switching of said control relay from said open position to said closed position within a predetermined time period after AC power is supplied to the branch circuit, whereby said slave relay remains in the normally closed position with the slave capacitance disconnected from the ballast circuit during said predetermined time period.

19. A bi-level lighting control system according to claim 16, wherein:
   said timing means includes an output, said output having a first logic state indicative of the predetermined time period not having been reached and a second logic state indicative of the predetermined time having been reached;
   said input receiving means comprises an optoisolator having an output with a first logic state indicative of a signal not being received and a second logic state indicative of a signal having been received; and
   said switching control means further includes a plurality of logic gates connected to said outputs of said timing means and said input receiving means for controlling the switch position of said master relay.

20. A slave unit of a bi-level control system for connection in an HID luminaire having (i) an HID lamp and (ii) a ballast circuit including a ballast capacitance connected to said lamp for controlling the lamp operating current, said slave unit comprising:
   i) a slave capacitance
   ii) and electro-mechanical slave relay for switching said slave capacitance into and out of the ballast circuit in the luminaire, said slave relay including a moveable switch member moveable between a normally closed and an open switch position and a coil energizeable for moving said switch member,
   iii) a first lead connected to one side of said coil for connection to a common, neutral line of an AC power supply branch circuit,
   iv) a second lead connected to the other side of said coil for connection to a switchable line voltage output of a control unit of the control system, said second lead being connectable to said output of the control unit with a single control line,
   v) a third lead connected to one side of said slave capacitance for connection to an output lead of the ballast circuit output connected to the ballast capacitance, and
   vi) a fourth lead connected to the other side of the slave capacitance for connection to the lamp in the luminaire,
   with said leads of said slave unit respectively connected to the switchable line voltage output of the control unit, the common and line voltage lines of the branch circuit, and the ballast, said slave relay is responsive to a line voltage signal received on said second lead from said output of said control unit for one of (a) switching said slave capacitance into the ballast circuit and (b) switching said slave capacitance out of the ballast circuit, whereby the light output level of the HID lamp is switched from a first light output level to a second, different light output level.

21. A slave unit according to claim 20, wherein said slave relay is connected to said slave capacitance and said leads of said slave unit such that with said slave relay in said normally closed switch position said slave capacitance is disconnected from the ballast capacitance and in the open position of said slave relay said slave capacitance is electrically connected with said ballast and HID lamp, whereby in said open switch position of said slave relay the HID lamp operates at reduced light output level reduced with respect to the light output level in the closed switch position of said slave relay when said slave capacitance is not switched in said ballast circuit.

22. A slave unit according to claim 21, wherein said slave capacitance is a single capacitor component, and wherein for connection of said slave unit to a ballast circuit in which the ballast capacitance consists of a single capacitor component having a rated voltage, said capacitor component in said slave unit has a lower rated voltage than the rated voltage of the capacitor component in the ballast circuit.

23. A slave unit according to claim 22, wherein said slave unit further includes a surge suppressor connected to said slave capacitor and said electro-mechanical slave relay for protecting said slave relay from current surges from discharging of said slave capacitor upon the switching of said slave capacitor out of the ballast circuit by said slave relay.

24. A slave unit according to claim 23, further comprising a housing in which said slave capacitor, slave relay, and surge suppressor are enclosed, said slave leads extending from said housing for connection to the common line of the branch circuit, the control line from the output of the control unit, the one of the ballast leads connected to the ballast capacitance, and a lamp terminal of the HID lamp.

25. A control unit of a bi-level HID control system having a slave unit with a switched capacitor and a slave relay connected thereto, the slave relay being switchable with a line voltage signal received on a control input thereof, said control unit comprising:
   i) a pair of power inputs each connectable to a respective one of the common and line voltage lines of an AC power supply branch circuit;
   ii) a control output;
   iii) switching means comprised of an electromechanical control relay having first and second switch positions, in only one of said switch positions said control output being connected to said power input connectable to the line voltage line; and
   iii) switching control means for switching said control relay between said switch positions to control the connection of the line voltage line to the output, whereby switching of the slave relay is controlled when its control input is connected to said control output of said control unit with a single control line.

26. A control unit according to claim 25, wherein said control unit further comprises input receiving means for receiving AC or DC input signals, and
   said switching control means is responsive to an input signal received by said input receiving means for switching said control relay.

27. A control unit according to claim 26, further comprising timing means coupled to said switching control means for preventing switching of said master relay within a predetermined time period after AC power is supplied to the branch circuit.

28. A control unit according to claim 27, wherein:
   said timing means includes an output, said output having a first logic state indicative of the predetermined time period not having been reached and a second logic state indicative of the predetermined time having been reached;
   said input receiving means comprises an optoisolator having an output with a first logic state indicative of a signal not being received and a second logic state indicative of a signal having been received; and
   said switching control means includes a plurality of logic gates connected to said outputs of said timing means and said optoisolator for controlling the switch position of said control relay.

29. A bi-level HID lighting system including an AC power supply branch circuit having a line voltage line and a common line, at least one HID lamp, a ballast means connected to said HID lamp and said line voltage and common lines for providing stable operating power to said lamp, a switched slave capacitance, a slave relay for switching said slave capacitance into and out of circuit with said HID lamp and ballast means to switch said HID lamp between a first light output level and a second different light output level, said slave relay having a pair of control inputs, and a control unit connected to said slave relay for controlling the switching of said slave relay, wherein the improvement comprises:
   one of said control inputs of said slave relay is connected to said common line of said AC branch circuit;
   said control unit includes switch means for switchably connecting the line voltage line to an output of the control unit; and
   a single control line connects said output of said control unit to the other of said control inputs of said slave relay, whereby switching of said line voltage line to said output of said control unit switches said slave relay and one of a) connects the slave capacitance in circuit with said ballast and HID lamps and b) disconnects said slave capacitance from said ballast and HID lamp, whereby the light output level of the HID lamp is switched between the first and second, different output levels.

30. A bi-level HID lighting system according to claim 29, wherein said control unit includes a power input for connection to said line voltage line of said AC power supply branch circuit, and said control relay includes a first switch position connecting said power input of said control unit and said output of said control relay such that a circuit is completed between said power input of said control unit, through said control relay, through said control line and control inputs of said slave relay to said common line for switching said slave relay to switch said lamp between said first and second light output levels.

31. A bi-level HID lighting system according to claim 30, wherein said slave relay is an electro-mechanical relay having switch contacts, a moveable switch member moveable between first and second switch positions against said switch contacts, and a coil connected between said control inputs of said slave unit for moving said switch member, said coil being energized with said control relay in said first switch position such that said switched capacitor is switched into series with said ballast means and HID lamp.

32. A bi-level HID lighting system according to claim 31, further comprising surge suppression means for suppressing current surges across said switch contacts and switch member by discharging of said switched capacitance upon switching of said switched capacitance out of circuit with said ballast means and HID lamp.

33. A bi-level HID lighting system according to claim 29, wherein said control unit includes means for receiving a control input on a single input line.

34. A bi-level HID lighting system according to claim 33, wherein said means for receiving a control input comprises an optoisolator having a pair of control inputs, one of said control inputs being connected to a common line within said control unit and the other being connected to a single input line.

* * * * *